United States Patent
Smith et al.

(10) Patent No.: US 7,065,603 B2
(45) Date of Patent: Jun. 20, 2006

(54) VIRTUAL BUS INTERFACE PRODUCTION OF HEADER-TYPE FIELDS FROM DATA-TYPE FIELDS

(75) Inventors: Zachary Steven Smith, Fort Collins, CO (US); John Warren Maly, Laporte, CO (US); Ryan Clarence Thompson, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 170 days.

(21) Appl. No.: 10/812,150

(22) Filed: Mar. 29, 2004

(65) Prior Publication Data

US 2005/0216638 A1    Sep. 29, 2005

(51) Int. Cl.
*G06F 13/14* (2006.01)
*G06F 13/36* (2006.01)
*H04H 1/02* (2006.01)

(52) U.S. Cl. .................................... 710/305; 710/311

(58) Field of Classification Search ............... 710/311, 710/305, 62, 72, 3, 8, 104, 105, 100; 370/349, 370/392, 466, 474, 389, 463; 709/220, 221, 709/230; 711/203; 714/776
See application file for complete search history.

(56) References Cited

U.S. PATENT DOCUMENTS

| | | | | |
|---|---|---|---|---|
| 6,516,442 B1 * | 2/2003 | Wang et al. | ................. | 714/776 |
| 6,591,310 B1 * | 7/2003 | Johnson | .................... | 710/3 |
| 6,665,742 B1 * | 12/2003 | Owen et al. | .................. | 710/10 |
| 6,697,352 B1 * | 2/2004 | Ludwig et al. | .............. | 370/349 |
| 6,857,033 B1 * | 2/2005 | Gulick et al. | .................. | 710/62 |
| 2002/0071450 A1 * | 6/2002 | Gasbarro et al. | ........... | 370/463 |
| 2002/0103945 A1 * | 8/2002 | Owen et al. | .................. | 710/10 |
| 2002/0172195 A1 * | 11/2002 | Pekkala et al. | ............. | 370/360 |
| 2003/0110338 A1 * | 6/2003 | Wang et al. | ................. | 710/305 |

OTHER PUBLICATIONS

"A supercomputer system interconnect and scalable IOS" by Johnson, B.; Scott, S. (abstract only) Publication Date:Sep. 11-14, 1995.*

* cited by examiner

*Primary Examiner*—Gopal C. Ray (57) ABSTRACT

Systems, methodologies, media, and other embodiments associated with a system for producing a bus-type header-type field from a point-to-point data-type field are described. One exemplary system embodiment includes a logic configured to identify that a point-to-point transaction includes non-memory-data information encoded in a data flit, a logic configured to extract the non-memory-data information from the data flit, and a logic configured to produce a header-type field for a bus-type transaction produced by the virtual bus interface from the point-to-point transaction.

17 Claims, 8 Drawing Sheets

VIRTUAL BUS INTERFACE PRODUCTION OF HEADER-TYPE FIELDS FROM DATA-TYPE FIELDS

BACKGROUND

Computer systems may include computer components that are operably connected together by, for example, a bus and/or a port(s) into point-to-point (P2P) links. Components operably connected by a bus typically "listen" to substantially every request placed on the bus and "hear" substantially every response on the bus. To facilitate listening, hearing, and the like, various bus communication techniques, timings, protocols, transaction formats, packet formats, and so on, have evolved. Thus, a transaction like a data read in a bus model system may include producing and monitoring various phases (e.g., arbitration, requests, snooping, data) and sending/receiving various packets of information during these phases. The packets may include, for example, header sections and data sections.

Systems whose computer components are operably connected by P2P links may operate substantially differently than those whose components are connected by a bus. There may be packets associated with P2P link networks that do not directly correspond to packets associated with bus-type systems. Similarly, information that may be transmitted as data in one system (e.g., P2P) may be treated as header information in the other system (e.g., bus). In a P2P system, a transaction (e.g., data read) may be performed by sending and receiving packets and/or flits between various source and destination components. Typically, a P2P packet includes a header flit(s) and a data flit(s). The data flit(s) typically store actual data values from a computer memory, but in some cases information other than data values may be encoded in a data flit(s). For example, header information that may overflow a P2P packet header may be stored in a data flit(s).

In environments like processor verification and hybrid multi-processing, some components may be connected by a bus like a front-side bus (FSB) and other components may be connected by P2P links. FSB connected systems perform certain actions in certain ways. For example, messages intended for one component may be broadcast on the FSB, received by all components operably connected to the FSB, and acted on by target components. P2P link connected components perform certain actions in certain other ways. For example, packets may be transmitted between specific components with a crossbar "traffic cop" responsible for directing packets/flits. Since both FSB connections and P2P connections have strengths and weaknesses it is not surprising that some computer systems are FSB connected while others are P2P configured. In some examples, a multiprocessor system or other computing system may even include computer components that are connected using both methods.

Tools have developed for designing, analyzing, testing, and so on, systems that use a bus model to connect components. Other tools have developed for designing, analyzing, testing, and so on, systems that use a P2P model to connect components. Since the two systems are fundamentally different, a tool known as a virtual bus interface (VBI) was developed to facilitate producing bus-type transactions from P2P transactions. This may in turn facilitate communication between systems employing a bus model and systems employing a P2P model and/or correlating results from different tools. But, as described above, the conceptual and logical structure of P2P transactions differs fundamentally from that of bus transactions. For example, what is a header field in one model may be a data field in another model, and vice versa. In some cases, data that may have been too extensive to reside in a header in a transaction from one model may comfortably fit in a header in a transaction from another model. In other cases, information that is stored in a data flit in a P2P system (e.g., non-memory data bitfields) may not be considered as data in a bus system.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Example systems and methods described herein concern a virtual bus interface (VBI) configured to process point-to-point (P2P) transactions into bus-type transactions, where the VBI can selectively produce bus model header-type fields from data stored in a P2P transaction data-type field(s).

A P2P transaction packet typically includes a header flit(s) and a data flit(s). The data flit(s) generally store data values read from a computer-readable memory. However, in some cases, other information may be stored and/or encoded in a data flit(s). For example, some P2P transactions may employ header data that exceeds the typically fixed size allocated for a P2P transaction header flit(s). In these cases, additional header-type data may be encoded as a data value in, for example, a data flit(s). Thus, an example virtual bus interface may be configured to detect a P2P packet that encodes header-type data (e.g., non-memory data information stored in bit fields) in a data flit(s). Upon detecting the P2P packet with data flit(s) that encode header-type information, the VBI may dispatch the transaction and/or data flit(s) to a decoding function specific to the packet type. In one example, a VBI may have available a decoding function for each transaction type available to the P2P link network and thus the decoding functions may be made non-memory data decode specific. A non-memory data decode specific module may, for example, extract non-memory data information in a bit-field wise manner from a data flit(s) to facilitate producing bus model header-type information.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer-readable medium", as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks and so on. Volatile media may include, for example, optical or magnetic disks, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software.

Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Figure 1:
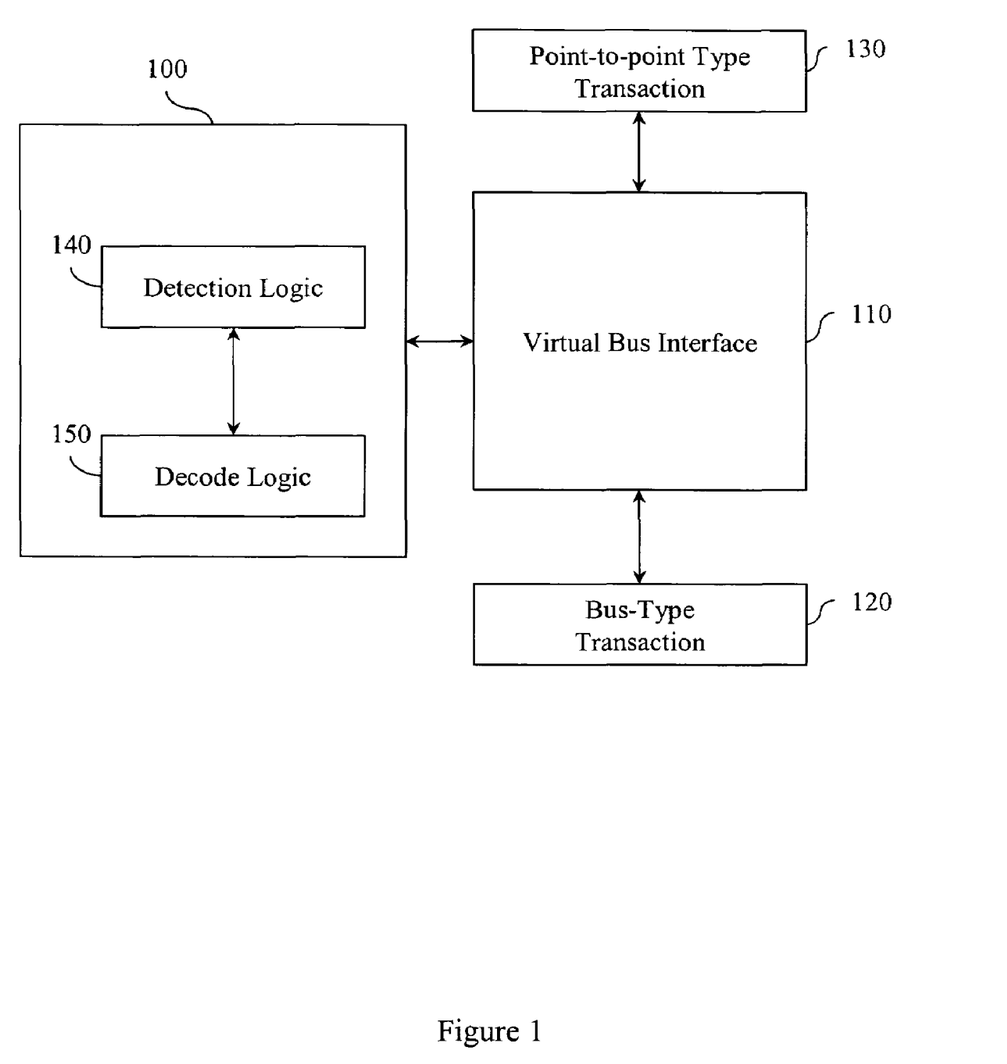
FIG. 1 illustrates an example virtual bus interface based system for producing a bus model header-type field from a point-to-point model data-type field.

FIG. 1 illustrates an example virtual bus interface based system 100 for producing a bus model header-type field from a P2P model data-type field. The system 100 may be configured to alter the behavior of a virtual bus interface 110 that is configured to produce a bus-type transaction 120 from a point-to-point type transaction 130. The system 100 may include a detection logic 140 that is configured to detect that the point-to-point transaction 130 includes a data-type field that stores data from which a value for a header-type field in the bus-type transaction 120 can be produced. In one example, the detection logic 140 may be configured to detect that the point-to-point type transaction 130 includes the data-type field storing header-type data by examining a transaction type associated with the point-to-point type transaction 130. Upon detecting that the point-to-point type transaction 130 includes a data-type field storing header-type data, the detection logic 140 may generate a signal that is distributed to the decode logic 150 and/or the virtual bus interface 110.

The system 100 may also include a decode logic 150 that is operably connected to the detection logic 140. The decode logic 150 may be configured to extract the data from the data-type field, to process the data into the value, and to selectively store the value in the header-type field. While storing the value in the header-type field is described, it is to be appreciated that the decode logic 150 may take other actions like providing the value to the VBI 110. In one example, the decode logic 150 extracts the data from the data-type field in a bit-field wise manner. The data in the data-type field may be stored, for example, in one or more data flits. In one example, the decode logic 150 may be configured to facilitate the virtual bus interface 110 producing a front-side bus type transaction.

In one example, a P2P transaction packet associated with a translation look-aside buffer (TLB) purge may need more header space than is typically available in a standard P2P transaction header. For example, header information may include line address(es), peak size(s), timing data, and other information. Thus, to avoid losing the header information, some header information may end up in data flit(s). While the P2P transaction header size may not accommodate the amount of data available, a corresponding bus model transaction header may accommodate the data. Thus, values stored in a data flit in the P2P transaction may be retrieved from the data flit(s) and stored in a header-type field in the bus-type transaction.

Figure 2:
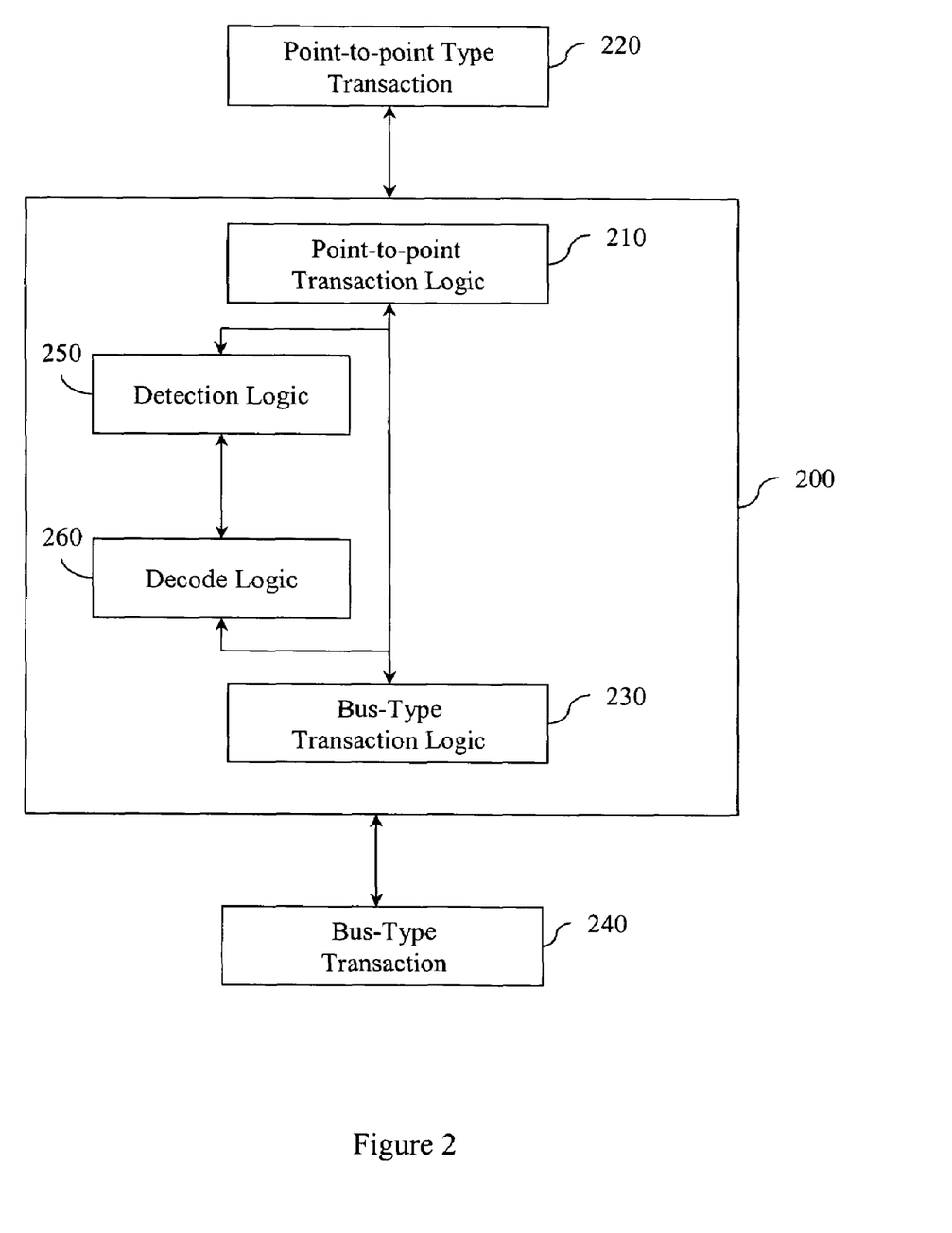
FIG. 2 illustrates another example virtual bus interface based system for producing a bus model header-type field from a point-to-point model data-type field.

FIG. 2 illustrates another example virtual bus interface based system 200 configured to produce a bus model header-type field from a P2P model data-type field. The system 200 may include a point-to-point transaction logic 210 that is configured to receive packets associated with a point-to-point type transaction 220. The packets associated with the P2P type transaction 220 may be received, for example, from a P2P linked system, a tool interacting with a P2P linked system, a portion of a hybrid multi-processing system, and so on.

The system 200 may also include a bus-type transaction logic 230 that is operably connected to the point-to-point transaction logic 210. The bus-type transaction logic 230 may be configured to produce packets and/or data structures associated with a bus-type transaction 240 from the packets associated with the point-to-point type transaction 220. While some P2P transaction formats may have a relatively simple one-to-one correspondence with some bus-type transaction formats, other P2P transaction formats may not be so straightforwardly processed into bus-type transaction formats. For example, some point-to-point transactions may have header information stored in data flits while the corresponding bus-type transaction will store similar and/or related (e.g., derived) information in its header. For example, a bus-type transaction may store in its header information derived from a data field in a P2P transaction. Therefore, the system 200 may include a detection logic 250 that is operably connected to the point-to-point transaction logic 210 and/or the bus-type transaction logic 230. The detection logic 250 may be configured to detect that the point-to-point type transaction 220 includes a data flit that encodes a non-memory-data value. In one example, the detection logic 250 may detect that the point-to-point type transaction 220 includes a data flit that encodes a non-memory-data value by examining a transaction type associated with the point-to-point type transaction 220. In another example, the detection logic 250 may detect that the point-to-point type transaction 220 includes a data flit that encodes a non-memory-data value by examining a request type associated with the point-to-point type transaction 220. Upon detecting that a data flit encodes a non-memory-data value, the detection logic 250 may generate a signal that is distributed to, for example, the point-to-point transaction logic 210, the decode logic 260, and/or the bus-type transaction logic 230.

Figure 8:
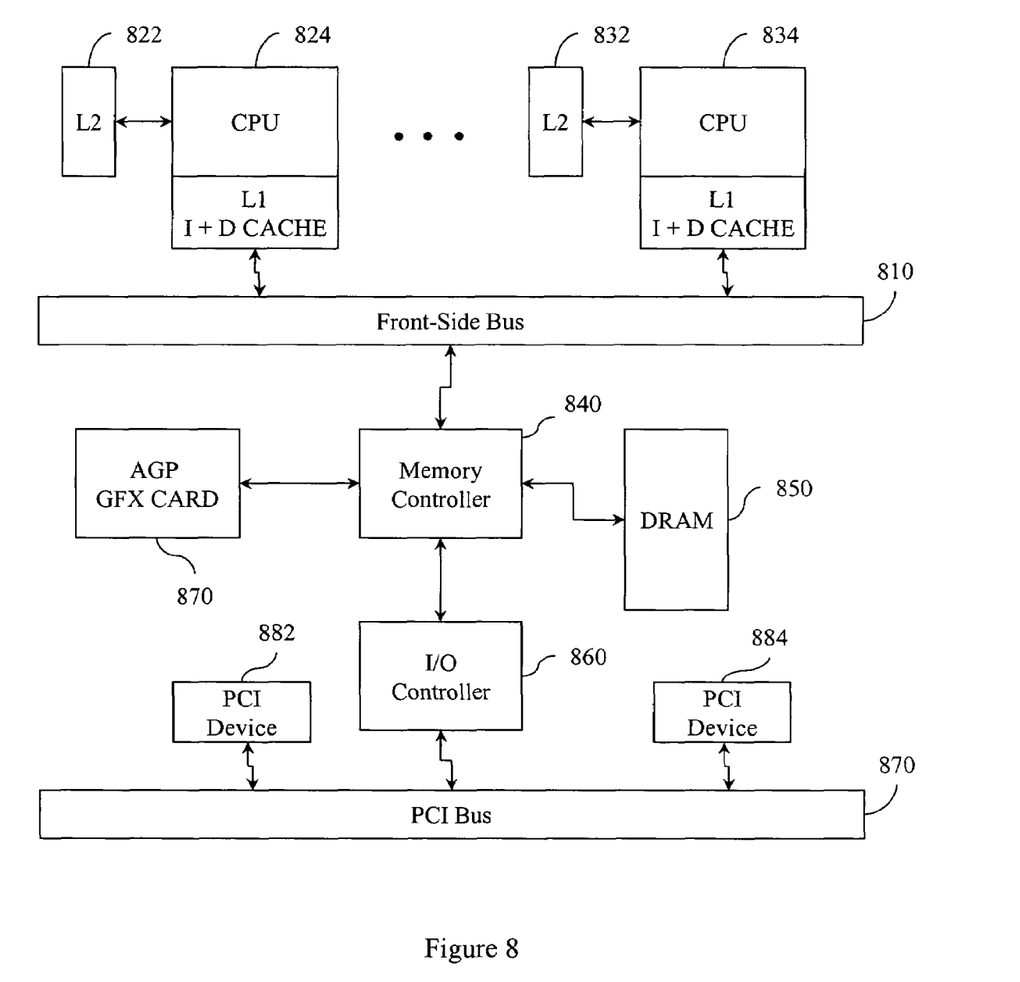
FIG. 8 illustrates an example multiprocessing system.

The system 200 may also include a decode logic 260 that is operably connected to the detection logic 250 and the bus-type transaction logic 230. The decode logic 260 may be configured to extract the non-memory-data value from the data flit, to decode the non-memory-data value, and to selectively provide the decoded non-memory-data value to the bus-type transaction logic 230. In one example, the decode logic 260 may extract the non-memory-data value from the data flit in a bit-field wise manner. The decode logic 260 may be configured to process a point-to-point type transaction that includes a non-memory-data value stored in two or more data flits. In one example, the system 200 may produce a bus type transaction for a front-side bus. For example, FIG. 8 illustrates a multi-processing system that includes components connected by a front-side bus 810. Thus, a system like system 200 may provide transactions to the multi-processing system, where the transactions are in a front-side bus format and were produced from packets associated with a P2P transaction.

Figure 3:
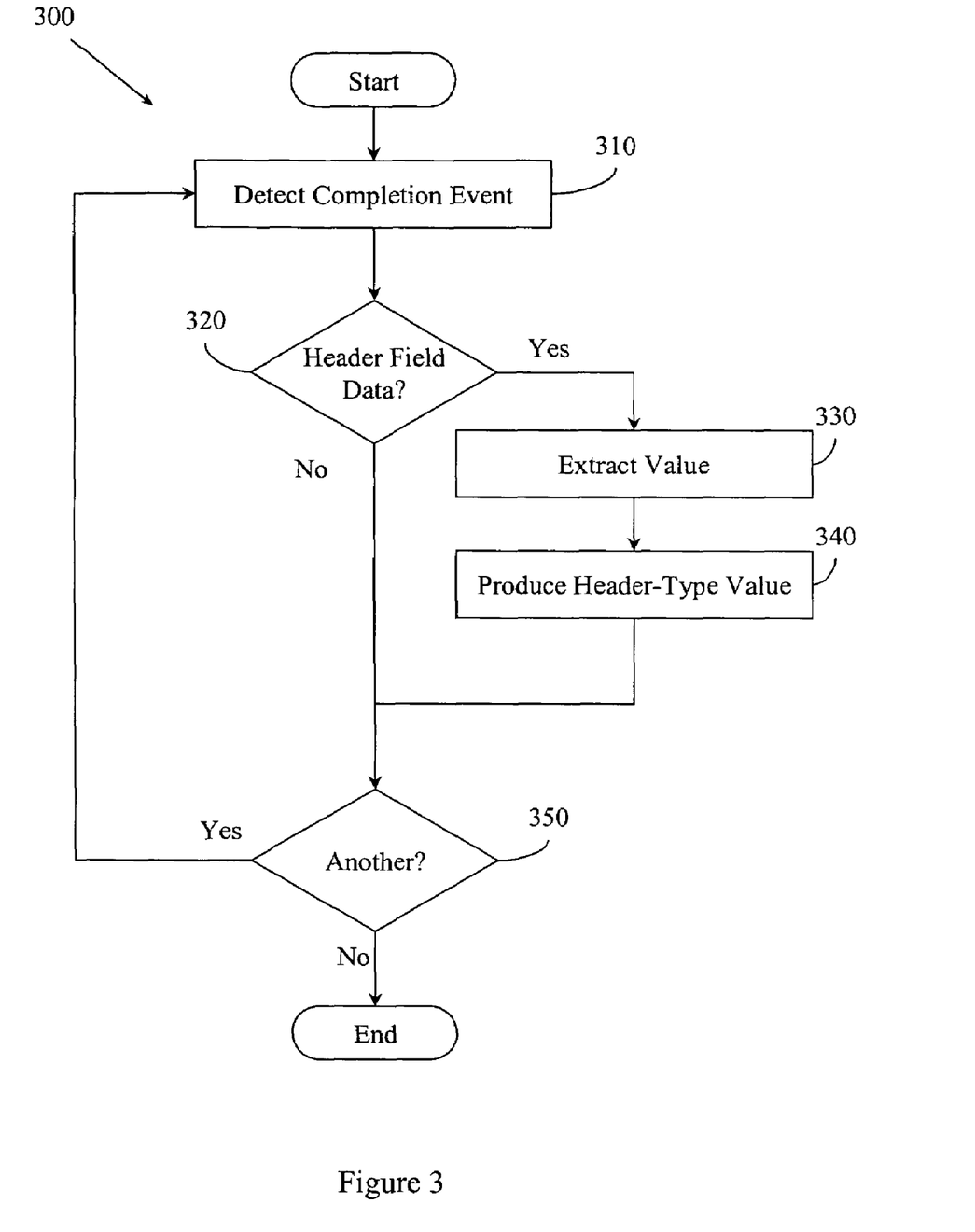
FIG. 3 illustrates an example method for producing a bus model header-type field from a point-to-point model data-type field.
Figure 4:
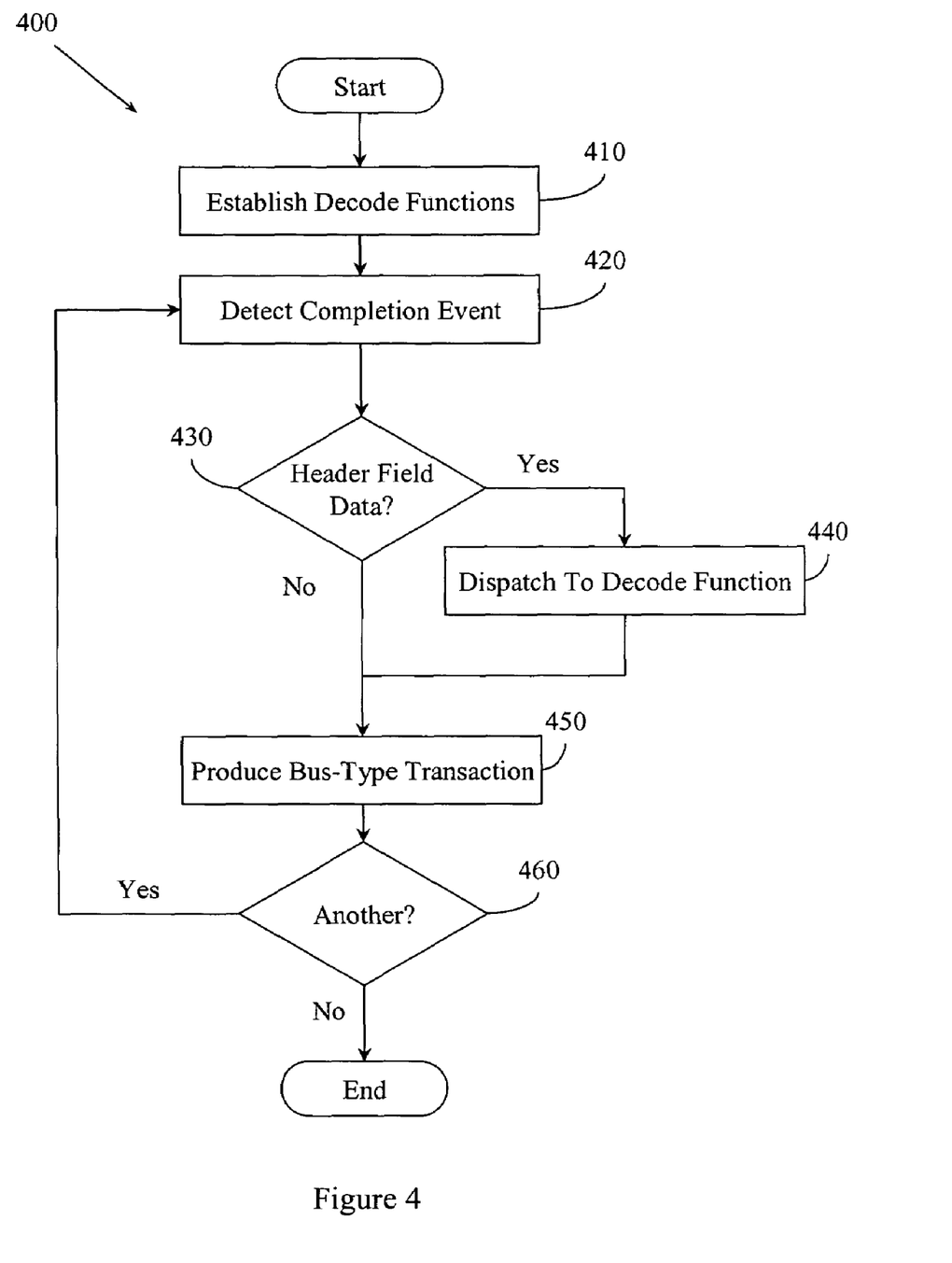
FIG. 4 illustrates another example method for producing a bus model header-type field from a point-to-point model data-type field.

Example methods may be better appreciated with reference to the flow diagrams of FIGS. 3 and 4. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

FIG. 3 illustrates an example method 300 for producing a bus model header-type field from a P2P model data-type field. The method 300 may be performed, for example, in a virtual bus interface. The method 300 may include, at 310, detecting a completion event associated with receiving a point-to-point transaction to be processed into a bus-type transaction by the virtual bus interface. Detecting a completion event may include, for example, determining that the last flit in a header has arrived, determining that the last flit in a packet has arrived, and so on.

The method 300 may also include, at 320, making a determination whether the point-to-point transaction includes a data flit that stores a value to be processed into a header-type field in the bus-type transaction. Determining whether the point-to-point transaction includes such a data may include, for example, examining a transaction type associated with the point-to-point transaction.

If the determination at 320 is Yes, then the method 300 may continue, at 330, to selectively extract the value from the data flit and, at 340, to produce a header-type value from the extracted value. In one example, the value may be extracted in a bit-field wise manner from a data flit(s). Producing the header-type value may include, for example, changing the format of a value (e.g., bit-field to integer), changing the order of a value (e.g., big-endian to little-endian), performing a table lookup to retrieve a header value associated with a bit-field code, and so on. Producing the header-type field includes manipulating one or more electrical signals in a computer memory.

At 350, a determination may be made concerning whether another P2P transaction is to be processed. If the determination is Yes, then processing may return to 310, otherwise processing may conclude.

FIG. 4 illustrates an example method 400 for producing a bus model header-type field from a P2P model data-type field. The method 400 may include, at 410, establishing a decode function for a point-to-point transaction type in which a data flit encodes a non-memory data value. Establishing a decode function may include, for example, causing a set of processor executable instructions to be loaded into a computer memory and producing a mapping between the instructions and a packet type. While a decode function is described, it is to be appreciated that decoding may be performed by entities including, but not limited to, a subroutine, an object method, a function, a program, an applet, a logic, and so on. The decode function may be tasked with extracting a header-type value from a data flit, processing it into header-type data, and making it available to other processes or logics.

With the decode function(s) established, the method 400 may proceed, at 420, to detect a completion event associated with receiving packets associated with a point-to-point transaction to be processed into a bus-type transaction by a virtual bus interface. After the point-to-point transaction is received, the method 400 may include determining, at 430, whether the point-to-point transaction includes a data flit that stores a value to be processed into a header-type field in the bus-type transaction. The detection may be made, for example, by examining a transaction type associated with the point-to-point transaction.

Upon determining that a data flit stores a value to be processed into a header-type field in a bus-type transaction, the method 400 may proceed, at 440, to pass the data flit(s) and/or P2P transaction to a decode function. The decode function may process the data flit(s), and return a value suitable for inclusion in a bus-type transaction header. Thus, at 450, the method 400 may produce a bus-type transaction using the packets associated with the P2P transaction and a value provided by the decode function. At 460, a determination may be made concerning whether to process another P2P transaction. If the determination is Yes, processing may return to 420, otherwise processing may conclude.

While FIG. 4 illustrates various actions occurring in serial, it is to be appreciated that various actions illustrated in FIG. 4 could occur substantially in parallel. By way of illustration, a first process could detect completion events, a second process could determine whether a P2P transaction is a type that employs decode functions to extract and/or decode header-type values from data-type fields, and a third process could produce bus-type transactions from P2P transactions and data returned from decode functions. While three processes are described, it is to be appreciated that a greater and/or lesser number of processes could be employed and that lightweight processes, regular processes, threads, and other approaches could be employed. It is to be appreciated that other example methods described herein may, in some cases, also include actions that occur substantially in parallel.

Example methodologies may be implemented as processor executable instructions and/or operations stored on a computer-readable medium. Thus, in one example, a computer-readable medium may store processor executable instructions operable to perform a method that includes establishing a decode function for a point-to-point transaction type in which a data flit encodes a non-memory data value. Establishing a decode function may include, for example, producing a mapping between a certain transaction type and a certain function to facilitate invoking that function when a transaction of that type is detected. With the decode functions established, the method may proceed to detecting a completion event associated with receiving a point-to-point transaction to be processed into a bus-type transaction by a virtual bus interface. Detecting a completion event may include receiving and interpreting an electrical signal. After the point-to-point transaction is received, the method may include determining whether the point-topoint transaction includes a data flit that stores a value to be processed into a header-type field in the bus-type transaction by examining a transaction type associated with the point-to-point transaction. Upon determining that a data flit stores a value to be processed into a header-type field in the bus-type transaction, the method may include passing the data flit to an established decode function, and storing a decoded value returned from the decode function. While the above method is described being stored on a computer-readable medium, it is to be appreciated that other example methods described herein can also be stored on a computer-readable medium.

Figure 5:
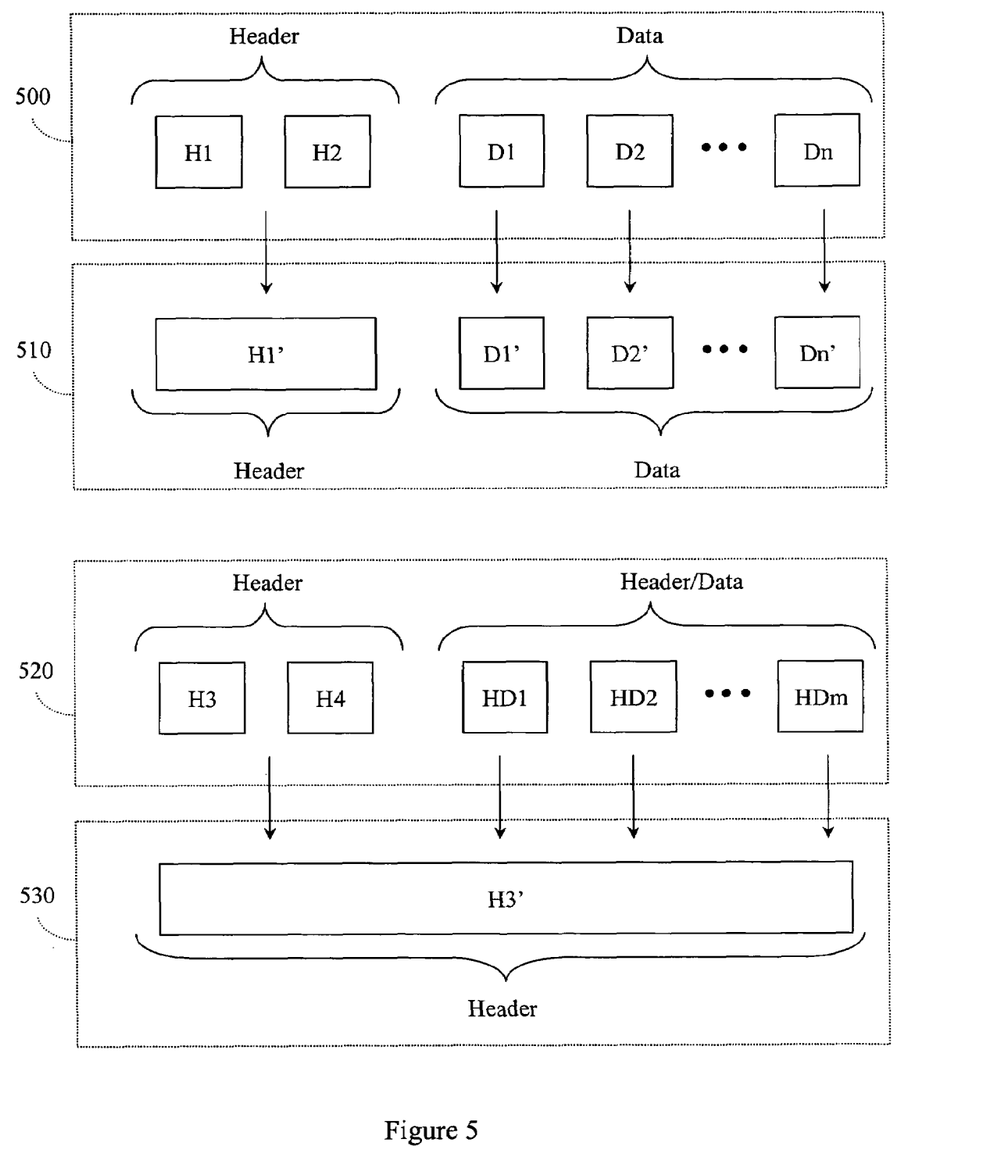
FIG. 5 illustrates two example sets of P2P transaction header and data flits that are processed into bus model transactions.

FIG. 5 illustrates two example sets of P2P transaction header and data flits that are processed into bus model transaction components. A first P2P transaction 500 may include header flits and data flits. For example, the transaction 500 may include header flits H1 and H2. Similarly, the transaction 500 may include data flits D1, and D2 through Dn, n being an integer. P2P transaction 500 may be processed by a virtual bus interface into bus transaction 510. Processing transaction 500 into transaction 510 may involve actions like, translating, re-ordering, re-formatting, and so on. Thus, header flits H1 and H2 may be processed into a single header section H1' in bus transaction 510. In some examples data may be processed directly between transactions and thus data flit D1 may be processed into data section D1', data flit D2 may be processed into data section D2', and so on.

Note that in processing transaction 500 into transaction 510 that no data from the data flits D1 through Dn was processed into header section H1'. However, in processing a second P2P transaction 520 into a second bus-type transaction 530, some data from data flits in transaction 520 will be processed into a header section of bus-type transaction 530. In the example illustrated by processing transaction 520 into transaction 530, substantially all the header and data information is processed into header section H3'. For example, header flits H3 and H4 are processed and contribute to header section H3'. Similarly, data flits that are encoding header information like HD1, and HD2 through HDm (m being an integer), are processed and contribute to header section H3'.

Figure 6:
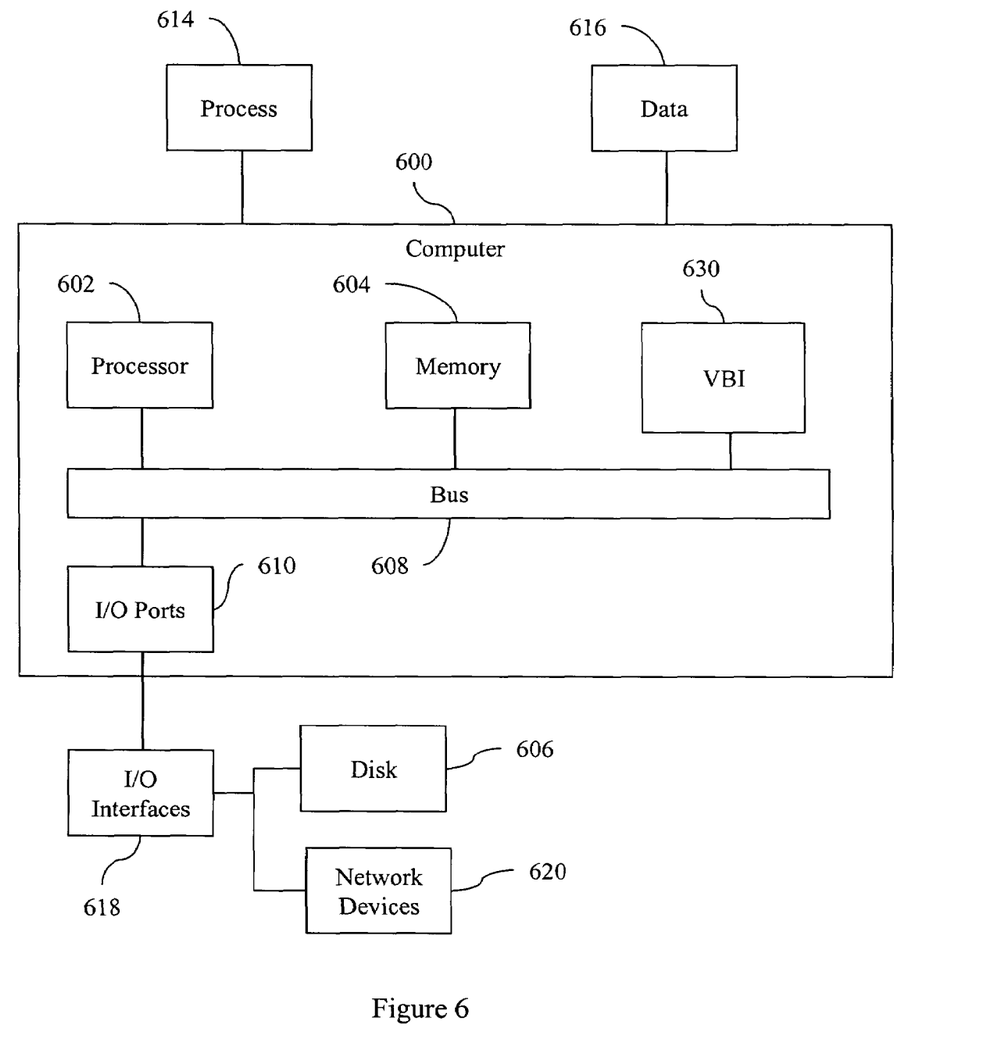
FIG. 6 illustrates an example computing environment in which example systems and methods illustrated herein can operate.

FIG. 6 illustrates a computer 600 that includes a processor 602, a memory 604, and input/output ports 610 operably connected by a bus 608. In one example, the computer 600 may include a VBI 630 configured to facilitate producing bus model header-type fields from P2P model data fields. The VBI 630, whether implemented in hardware, software, firmware, and/or a combination thereof, may provide means for determining whether a point-to-point transaction available to a virtual bus interface includes a data flit that stores non-memory-data information that will be stored in a bus-type header-type field. Similarly, the VBI 630, whether implemented in hardware, software, firmware, and/or a combination thereof, may provide means for extracting the non-memory-data information from the data flit and means for decoding the extracted non-memory-data information and making the decoded non-memory-data information available to a virtual bus interface logic configured to produce a header-type field for a bus-type transaction.

The processor 602 can be a variety of various processors including dual microprocessor and other multi-processor architectures. The memory 604 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can include, but is not limited to, devices like a magnetic disk drive, a solid state disk drive, a floppy disk drive, a tape drive, a Zip drive, a flash memory card, and/or a memory stick. Furthermore, the disk 606 can include optical drives like a CD-ROM, a CD recordable drive (CD-R drive), a CD rewriteable drive (CD-RW drive), and/or a digital video ROM drive (DVD ROM). The memory 604 can store processes 614 and/or data 616, for example. The disk 606 and/or memory 604 can store an operating system that controls and allocates resources of the computer 600.

The bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer, systems interface (SCSI) bus.

The computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and the like. The input/output ports 610 can include but are not limited to, serial ports, parallel ports, and USB ports.

The computer 600 can operate in a network environment and thus may be connected to network devices 620 via the i/o devices 618, and/or the i/o ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 620 can connect to WAN technologies including, but not limited to, point to point links, circuit switching networks like integrated services digital networks (ISDN), packet switching networks, and digital subscriber lines (DSL).

In one example, computer 600 may include a virtual bus interface system 630 that includes a point-to-point transaction logic configured to receive packets associated with a point-to-point transaction. The VBI 630 may also include a bus-type transaction logic operably connected to the point-to-point transaction logic, where the bus-type transaction logic is configured to produce a bus-type transaction corresponding to the point-to-point transaction from the packets associated with the point-to-point transaction. The VBI 630 may also include detection logic operably connected to the point-to-point transaction logic, where the detection logic is configured to detect that the point-to-point transaction includes a data flit that encodes a non-memory-data value. The VBI 630 may also include a decode logic operably connected to the detection logic and the bus-type transaction logic, where the decode logic is configured to extract the non-memory-data value from the data flit, to decode the non-memory data value, and to selectively provide the decoded non-memory-data value to the bus-type transaction logic.

Figure 7:
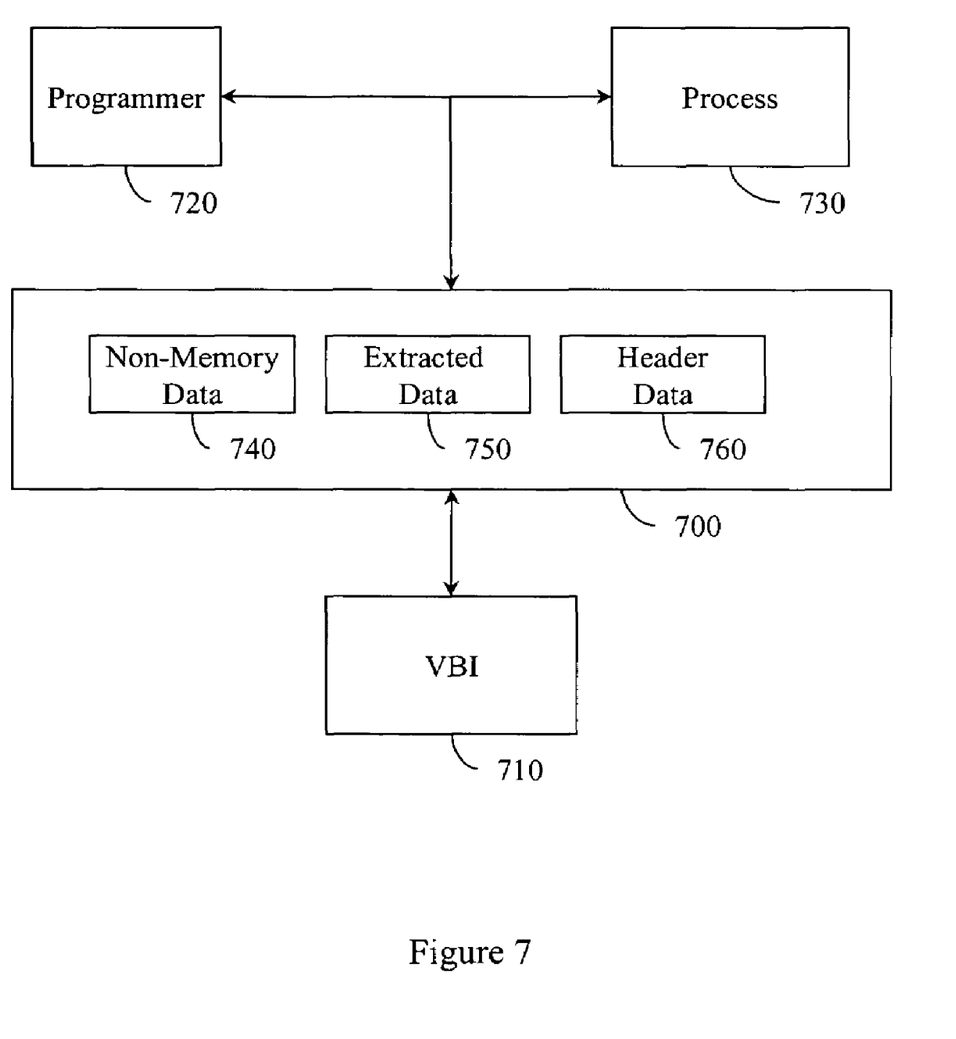
FIG. 7 illustrates an example application programming interface (API).

Referring now to FIG. 7, an application programming interface (API) 700 is illustrated providing access to a VBI 710 that is configured to produce bus model header-type fields from P2P model data-type fields. The API 700 can be employed, for example, by a programmer 720 and/or a process 730 to gain access to processing performed by the VBI 710. For example, a programmer 720 can write a program to access the VBI 710 (e.g., invoke its operation, monitor its operation, control its operation) where writing the program is facilitated by the presence of the API 700. Rather than programmer 720 having to understand the internals of VBI 710, the programmer 720 merely has to learn the interface to VBI 710. This facilitates encapsulating the functionality of VBI 710 while exposing that functionality.

Similarly, the API 700 can be employed to provide data values to the VBI 710 and/or retrieve data values from VBI 710. For example, a process 730 that parses P2P transactions can provide a P2P transaction data flit to VBI 710 via the API 700 by, for example, using a call provided in the API 700. Thus, in one example of the API 700, a set of application programming interfaces can be stored on a computer-readable medium. The interfaces can be employed by a programmer, computer component, logic, and so on, to gain access to a VBI 710 configured to produce bus model header-type fields from P2P model data-type fields. The interfaces can include, but are not limited to, a first interface 740 that communicates a data flit that stores a non-memory-data value (e.g., header type data), a second interface 750 that communicates a value that has been bitwise field extracted from the data flit, and a third interface 760 that communicates a header-type field for a bus-type transaction, where the header-type field is derived from the data retrieved from the data flit.

FIG. 8 illustrates an example system that employs a front-side bus 810. The system may include a set of CPUs (e.g., CPU 824 through CPU 834). While two CPUs are illustrated, it is to be appreciated that a greater and/or lesser number of CPUs may be employed. The CPUs may include an L1 cache that stores, for example, instructions and data. Similarly, the CPUs may include an L2 cache (e.g., L2 caches 822 through 832). Data and/or instructions may be transferred between the L1 caches and L2 caches.

In one example, CPU 824 and CPU 834 may communicate. This may involve an operation(s) involving the front-side bus 810. Similarly, CPU 824 may interact with a memory controller 840, which may also involve an operation(s) on the front-side bus 810. The memory controller 840 may provide access to, for example, a dynamic RAM 850, an I/O controller 860, a graphics card 870, and so on. The I/O controller 860 may in turn provide access to a set of PCI devices (e.g., PCI devices 882, 884) via a PCI bus 870.

The system illustrated in FIG. 8 may be a system for which a component (e.g., CPU 824, CPU 834) is simulated. For example, CPU 824 may be simulated by tools like an RTL tool, a golden simulator, and so on. The tools may not include a bus like front-side bus 810, but rather may be connected by a network model. Thus, a virtual bus interface like those described above may produce front-side bus operations from network model transactions to facilitate comparing results between the simulating tool and the simulated component. One action involved in such-production may include producing header-type fields from data that is encoded in a network-type data field.

While example systems, methods, and so on, have been illustrated by describing examples in considerable detail, it is not the intention of the applicants to restrict or limit the scope of the appended claims or the invention to such detail. It is, of course, not possible to describe every conceivable combination of components or methodologies for purposes of describing the example systems, methods, and so on, described herein. Therefore, the invention is not limited to the specific details, the representative apparatus, and illustrative examples. Thus, this application is intended to embrace alterations, modifications, and variations that fall within the scope of the appended claims. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modem Legal Usage 624 (2d. Ed. 1995).

What is claimed is:

1. A system configured to interact with a virtual bus interface that is configured to produce a bus transaction from a point-to-point transaction, the system comprising:
   a detection logic configured to detect whether the point-to-point transaction to be processed by the virtual bus interface includes a data field that stores a data from which a value for a header field in a bus transaction can be produced; and
   a decode logic operably connected to the detection logic, the decode logic being configured to extract the data from the data field, to process the data into the value, and to selectively store the value in the header field in the bus transaction.

2. The system of claim 1, where the bus transaction comprises a front-side bus transaction.

3. A system configured to interact with a virtual bus interface that is configured to produce a bus transaction from a point-to-point transaction, the system comprising:
   a detection logic configured to detect whether the point-to-point transaction to be processed by the virtual bus interface includes a data field that stores a data from which a value for a header field in a bus transaction can be produced; and
   a decode logic operably connected to the detection logic, the decode logic being configured to extract the data from the data field, to process the data into the value, and to selectively store the value in the header field in the bus transaction,
   where the detection logic detects whether the point-to-point transaction includes a data field that stores a data from which a value for a header field can be produced by examining a transaction type associated with the point-to-point transaction.

4. The system of claim 3, where the decode logic extracts the data from the data field in a bit-field wise manner.

5. The system of claim 4, where upon detecting that a point-to-point transaction stores a data from which a value for a headertype field can be produced, the detection logic generates a signal that is distributed to one or more of the decode logic and the virtual bus interface.

6. A virtual bus interface system, comprising:
a point-to-point transaction logic configured to receive a packet associated with a point-to-point transaction;
a bus transaction logic operably connected to the point-to-point transaction logic, the bus transaction logic being configured to produce a bus transaction corresponding to the point-to-point transaction from the packet associated with the point-to-point transaction;
a detection logic operably connected to the point-to-point transaction logic, the detection logic being configured to detect whether the packet associated with the point-to-point transaction includes a data flit that encodes a non-memory-data value; and
a decode logic operably connected to the detection logic and the bus transaction logic, the decode logic being configured to extract the non-memory-data value from the data flit, to decode the non-memory data value, and to selectively provide the decoded non-memory-data value to the bus transaction logic.

7. The system of claim 6, where the detection logic detects whether the packet associated with point-to-point transaction includes a data flit that encodes a non-memory-data value by examining a transaction type associated with the point-to-point transaction.

8. The system of claim 7, where the decode logic extracts the non-memory-data value from the data flit in a bit-field wise manner.

9. The system of claim 6, where upon detecting that the packet associated with the point-to-point transaction includes a data flit that encodes a non-memory-data value, the detection logic generates a signal that is distributed to one or more of, the point-to-point transaction logic, the bus transaction logic, and the decode logic.

10. The system of claim 6, where the virtual bus interface produces a bus transaction for a front-side bus.

11. A computer configured with a virtual bus interface system, the virtual bus interface system comprising:
a point-to-point transaction logic configured to receive a packet associated with a point-to-point transaction;
a bus transaction logic operably connected to the point-to-point transaction logic, the bus transaction logic being configured to produce a bus transaction corresponding to the point-to-point transaction from the packet associated with the point-to-point transaction;
a detection logic operably connected to the point-to-point transaction logic, the detection logic being configured to determine whether the packet associated with the point-to-point transaction includes a data flit that encodes a non-memory-data value; and
a decode logic operably connected to the detection logic and the bus transaction logic, the decode logic being configured to extract the non-memory-data value from the data flit, to decode the non-memory data value, and to selectively provide the decoded non-memory-data value to the bus transaction logic.

12. A method, comprising:
in a virtual bus interface, detecting a completion event associated with receiving a point-to-point transaction to be processed into a bus transaction by the virtual bus interface;
determining whether the point-to-point transaction includes a data flit that stores a value to be processed into a header field in the bus transaction, and upon determining that a data flit stores a value to be processed into a header field in the bus transaction:
selectively extracting the value from the data flit; and
producing a header value from the extracted value,
where determining whether the point-to-point transaction includes a data flit that stores a value to be processed into a header field includes examining a transaction type associated with the point-to-point transaction.

13. The method of claim 12, where the value is extracted in a bit-field wise manner from the data flit.

14. The method of claim 13, including:
establishing a decode function for a point-to-point transaction type in which a data flit encodes a non-memory data value; and
upon determining that a data flit encodes a non-memory data value, passing the data flit to an established decode function.

15. A computer-readable medium storing processor executable instructions operable to perform a method, the method comprising:
in a virtual bus interface, establishing a decode function for a point-to-point transaction type in which a data flit encodes a non-memory data value;
detecting a completion event associated with receiving a point-to-point transaction to be processed into a bus transaction by the virtual bus interface;
determining whether the point-to-point transaction includes a data flit that stores a value to be processed into a header field in the bus transaction by examining a transaction type associated with the point-to-point transaction; and
upon determining that a data flit stores a value to be processed into a headertype field in the bus transaction, passing the data flit to an established decode function, and storing a decoded value returned from the decode function.

16. A system, comprising:
means for determining whether a point-to-point transaction available to a virtual bus interface includes a data flit that stores non-memory-data information that will be stored in a bus header field;
means for bitwise field extracting the non-memory-data information from the data flit; and
means for decoding the extracted non-memory-data information and making the decoded non-memory-data information available to a virtual bus interface logic configured to produce a header field for a bus transaction.

17. A set of application programming interfaces embodied on a computer-readable medium for execution by a computer component in conjunction with producing a header field for a bus transaction from non-memory-data information stored in a data flit in a point-to-point type transaction, comprising:
a first interface for communicating the data flit that encodes the non-memory-data information;
a second interface for communicating a non-memory-data value extracted from the data flit; and
a third interface for communicating a headertype data value for the bus transaction, where the header data value is produced from the non-memory-data value extracted from the data flit.

* * * * *

UNITED STATES PATENT AND TRADEMARK OFFICE
CERTIFICATE OF CORRECTION

PATENT NO. : 7,065,603 B2  Page 1 of 1
APPLICATION NO. : 10/812150
DATED : June 20, 2006
INVENTOR(S) : Zachary Steven Smith et al.

It is certified that error appears in the above-identified patent and that said Letters Patent is hereby corrected as shown below:

In column 12, line 33, delete "Modem" and insert -- Modern --, therefor.

In column 13, line 5, in Claim 5, delete "headertype" and insert -- header --, therefor.

In column 14, line 36, in Claim 15, delete "headertype" and insert -- header --, therefor.

In column 14, line 62, in Claim 17, delete "headertype" and insert -- header --, therefor.

Signed and Sealed this

Twenty-first Day of April, 2009

JOHN DOLL
*Acting Director of the United States Patent and Trademark Office*